(12) United States Patent
Magoshi

(10) Patent No.: US 7,269,745 B2
(45) Date of Patent: Sep. 11, 2007

(54) METHODS AND APPARATUS FOR COMPOSING AN IDENTIFICATION NUMBER

(75) Inventor: Hidetaka Magoshi, Palo Alto, CA (US)

(73) Assignee: Sony Computer Entertainment Inc. (JP)

( * ) Notice: Subject to any disclaimer, the term of this patent is extended or adjusted under 35 U.S.C. 154(b) by 976 days.

(21) Appl. No.: 10/245,946

(22) Filed: Sep. 18, 2002

(65) Prior Publication Data

US 2003/0229800 A1    Dec. 11, 2003

Related U.S. Application Data

(60) Provisional application No. 60/386,849, filed on Jun. 6, 2002.

(51) Int. Cl.
    G06F 11/30    (2006.01)
    H04L 9/32     (2006.01)
    G06F 1/04     (2006.01)
    G06F 13/28    (2006.01)

(52) U.S. Cl. .................. 713/194; 713/502; 710/28

(58) Field of Classification Search ............. None
     See application file for complete search history.

(56) References Cited

U.S. PATENT DOCUMENTS

| | | | | |
|---|---|---|---|---|
| 4,559,637 A | * | 12/1985 | Weber | 377/24.1 |
| 4,751,498 A | * | 6/1988 | Shalvi et al. | 340/524 |
| 5,271,016 A | * | 12/1993 | Hilden et al. | 714/752 |
| 5,452,355 A | | 9/1995 | Coli | |
| 5,612,631 A | * | 3/1997 | Agrawal et al. | 326/39 |
| 5,873,112 A | * | 2/1999 | Norman | 711/103 |
| 6,265,963 B1 | * | 7/2001 | Wood, Jr. | 340/10.4 |
| 2002/0053943 A1 | * | 5/2002 | Yamasaki et al. | 327/538 |

OTHER PUBLICATIONS

Fletcher, William I., "An Engineering Approach to Digital Design", 1980, pp. 251-254, Prentice Hall International.

* cited by examiner

Primary Examiner—Kambiz Zand
Assistant Examiner—A. Nobahar
(74) Attorney, Agent, or Firm—Lerner, David, Littenberg, Krumholz & Mentlik, LLP

(57) ABSTRACT

Methods and apparatus for producing an electronic ID number include modifying at least one physical bit element from among each of at least first and second groups of physical bit elements, each physical bit element of each group having a first physical state in which it is operable to produce a signal having a first electrical state, and being capable of permanent modification to a second physical state in which it is operable to produce a signal having a second electrical state; and producing (i) one bit of an identification (ID) number from the respective signals issuing from each of the respective at least first and second groups of physical bit elements, and (ii) a validity signal indicative of whether the one bit of the ID number is valid.

26 Claims, 2 Drawing Sheets

METHODS AND APPARATUS FOR COMPOSING AN IDENTIFICATION NUMBER

CROSS-REFERENCE TO RELATED APPLICATIONS

This application claims the benefits of U.S. Provisional Patent Application No. 60/386,849, filed Jun. 6, 2002, entitled METHODS AND APPARATUS FOR COMPOSING A DEVICE ID NUMBER, the entire disclosure of which is hereby incorporated by reference.

BACKGROUND OF THE INVENTION

The present invention relates to methods and apparatus for composing an identification number, which methods and apparatus mitigate against tampering of the identification number once it has been established.

The use of electronic equipment has opened very large and profitable markets in the areas of personal computing, home entertainment, communications, computer networking, transportation, avionics, etc. Indeed, one is pressed to identify a commercial market in which electronic devices do not play a critical role. It is desirable to have the capability of identifying a particular piece of electronic equipment, such as a piece of computing equipment, in order to enjoy security features, tracking (e.g., data mining) features, etc. within the system or systems in which the electronic equipment is utilized. So-called electronic identification (ID) numbers have traditionally been employed for this purpose.

An electronic ID number is conventionally established by way of a plurality of binary values, e.g., logic low (0) values and logic high (1) values, in sequence. Thus, for example, a typical electronic ID number may be expressed as: 00000101.

By way of example, this type of electronic ID number may be utilized to ensure that entities interesting in profiting from the sale of digital content, such as software applications, to end users are not financially harmed by those seeking to pirate such digital content or by those seeking to share such digital content on multiple computing devices. In particular, the computing device of an end user may be equipped with an electronic ID number and the digital content may be distributed to such end users on rewritable storage media. When an end user connects the rewritable storage medium to his or her computing device, the electronic ID number may be used to encrypt the digital content on the rewritable storage medium and overwrite the non-encrypted version of such digital content. When the end user seeks to execute the digital content on his or her computing device, the electronic ID number is used to decrypt the digital content stored on the rewritable storage medium. This system advantageously permits an authorized end user to execute the digital content on his or her computing device, but prohibits using the digital content on some other computing device, which has a different ID number or no ID number at all. Further details concerning this system may be found in U.S. Pat. No. 7,107,461, issued Sep. 21, 2006, the entire disclosure of which is hereby incorporated by reference.

Although systems that take advantage of electronic ID numbers, such as in the example above, will enjoy widespread success as to most end users of electronic equipment, some sophisticated end users may seek to thwart the security, tracking, or other objective by altering one or more electronic ID numbers. The means by which these malefactors alter the electronic ID numbers depends, to a large extent, on how the electronic ID number are implemented. A conventional approach to implementing an electronic ID number includes the use of anti-fuse technology, whereby a shorted anti-fuse element indicates a logic low (0) level and an open (or fused) anti-fuse element indicates a logic high (1) level. Thus, to implement the electronic ID number 00000101, eight anti-fuse elements would be employed, where all such elements would remain shorted except for the first and third elements, which would be fused. Unfortunately, this implementation of the electronic ID number is susceptible to unauthorized modification. Indeed, any of the un-fused elements implementing the ID number may be fused (i.e., opened) to obtain a different electronic ID number. For example, any of the second, and fourth through eighth anti-fuse elements may be fused and, thereby, change any of the logic low (0) values of the electronic ID number to logic high (1) values. Once the electronic ID number has been altered, there would be no way of determining whether unauthorized modification had taken place.

Accordingly, there are needs in the art for methods and apparatus for establishing electronic ID numbers such that the validity of such ID numbers may be determined and unauthorization modification may be detected.

SUMMARY OF THE INVENTION

In accordance with one or more aspects of the present invention, an apparatus includes at least first and second groups of physical bit elements, each physical bit element of each group having a first physical state in which it is operable to produce a signal having a first electrical state, and being capable of permanent modification to a second physical state in which it is operable to produce a signal having a second electrical state; and at least first and second bit logic circuits, each being associated with a respective one of the at least first and second groups of physical bit elements, and each operable to produce (i) one bit of an identification (ID) number from the respective signals issuing from each of the respective at least first and second groups of physical bit elements, and (ii) a validity signal indicative of whether the one bit of the ID number is valid.

Preferably, each of the bit logic circuits is further operable to produce a program signal indicative of whether any of the physical bit elements of a respective one of the groups have been modified. The program signal may indicate that the physical bit elements of a respective one of the groups have not been modified when all of the physical bit elements of that group are in the first physical state. Alternatively, the program signal may indicate that the physical bit elements of a respective one of the groups have not been modified when (i) a valid combination of the physical states of the physical bit elements of that group requires that one or more of the physical bit elements of that group are in the second physical state, and (ii) the one or more of the physical bit elements are in the first physical state.

The apparatus preferably further includes an ID logic circuit operable to receive one or more of the program signals from the bit logic circuits and produce an overall program signal indicative of at least one of whether (i) any of the physical bit elements of any of the groups have been modified, and (ii) at least one of the physical bit elements of each of the groups have been modified. The ID logic circuit may be further or alternatively operable to receive one or more of the validity signals from the bit logic circuits and produce an overall validity signal indicative of at least one of whether (i) any of the bits of the ID number are invalid, and (ii) none of the bits of the ID number are invalid.

Preferably, only one valid combination of the electrical states of the respective signals issuing from each of the respective at least first and second groups of physical bit elements represents a valid logic high level for the corresponding bit of the ID number; and only one different valid combination of the electrical states of the respective signals issuing from each of the respective at least first and second groups of physical bit elements represents a valid logic low level for the corresponding bit of the ID number. Further, it is preferred that each group consists of two physical bit elements; the valid combination representing a valid logic high level requires that one of the two physical bit elements is in the first physical state and the other of the two physical bit elements is in the second physical state; and the different valid combination representing a valid logic low level requires that the one of the two physical bit elements is in the second physical state and the other of the two physical bit elements is in the first physical state.

Preferably, any modification to the physical bit elements of a given one of the groups of physical bit elements in order change from a valid combination of the electrical states of the signals to another combination results in an invalid combination. It is preferred that the respective valid combinations of the electrical states of the signals each require that at least one of the physical bit elements of a given one of the groups of physical bit elements has been permanently modified to the second physical state in which it produces a signal having the second electrical state. Preferably, any modification to the physical bit elements of a given one of the groups of physical bit elements in order change from a valid combination of the electrical states of the signals to another combination requires that at least one of the physical bit elements of a given one of the groups of physical bit elements has to be permanently modified from the first physical state to the second physical state.

Each of the physical bit elements may be a fusible link having an unfused, substantially electrically conductive, first physical state, and having a fused, substantially electrically non-conductive, second physical state. Preferably, each physical bit element is coupled in a series combination with an impedance between two voltage potentials, and the corresponding signal is taken at a node between the physical bit element and the impedance. It is also preferred that each physical bit element and each impedance includes respective first and second terminals; the first terminal of each physical bit element being coupled to a first voltage potential and the second terminal of each physical bit element being coupled to the first terminal of a respective one of the impedances; and the second terminal of each impedance being coupled to a second, higher, voltage potential.

In accordance with one or more further aspects of the present invention, a method includes: modifying at least one physical bit element from among each of at least first and second groups of physical bit elements, each physical bit element of each group having a first physical state in which it is operable to produce a signal having a first electrical state, and being capable of permanent modification to a second physical state in which it is operable to produce a signal having a second electrical state; and producing (i) one bit of an identification (ID) number from the respective signals issuing from each of the respective at least first and second groups of physical bit elements, and (ii) a validity signal indicative of whether the one bit of the ID number is valid.

The method may further include producing a program signal indicative of whether any of the physical bit elements of a respective one of the groups have been modified. Preferably, the program signal indicates that the physical bit elements of a respective one of the groups have not been modified when all of the physical bit elements of that group are in the first physical state. Preferably, the program signal indicates that the physical bit elements of a respective one of the groups have not been modified when (i) a valid combination of the physical states of the physical bit elements of that group requires that one or more of the physical bit elements of that group are in the second physical state, and (ii) the one or more of the physical bit elements are in the first physical state.

The method preferably further includes receiving one or more of the program signals, and producing an overall program signal indicative of at least one of whether (i) any of the physical bit elements of any of the groups have been modified, and (ii) at least one of the physical bit elements of each of the groups have been modified.

The method may further include receiving one or more of the validity signals, and producing an overall validity signal indicative of at least one of whether (i) any of the bits of the ID number are invalid, and (ii) none of the bits of the ID number are invalid.

Other advantages, features and aspects of the invention will be apparent to one skilled in the art in view of the discussion herein taken in conjunction with the accompanying drawings.

BRIEF DESCRIPTION OF THE DRAWINGS

For the purposes of illustrating the invention, there are shown in the drawings forms that are presently preferred, it being understood, however, that the invention is not limited to the precise arrangements and instrumentalities shown.

DETAILED DESCRIPTION

Figure 1:
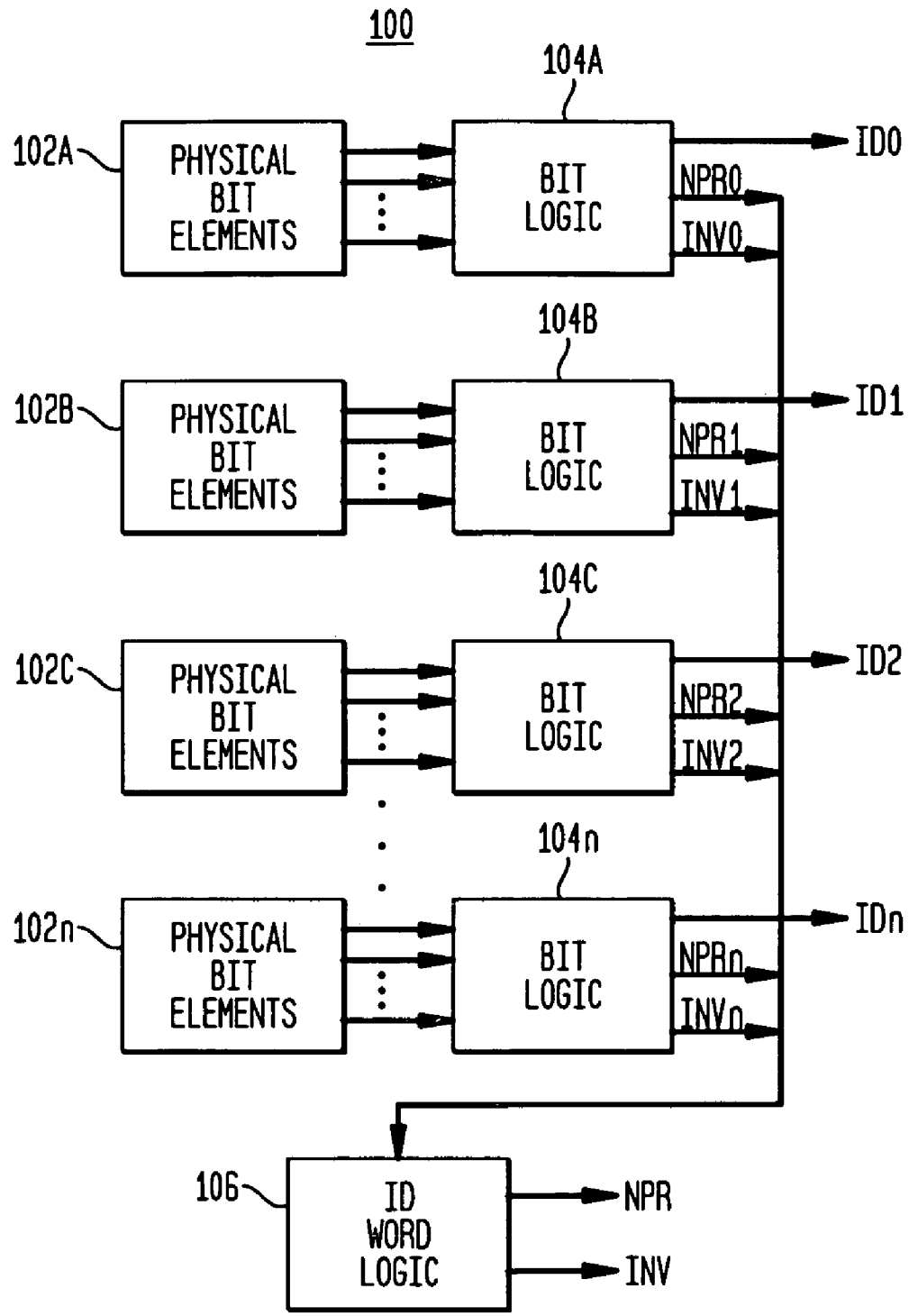
FIG. 1 is a block diagram illustrating one or more aspects of various methods and apparatus that may be employed to implement one or more embodiments of the present invention.

Referring now to the drawings, wherein like numerals indicate like elements, there is shown in FIG. 1 a block diagram illustrating one or more aspects of the present invention. For the purposes of brevity and clarity, the block diagram of FIG. 1 will be referred to, and described herein, as illustrating an apparatus 100, it being understood, however, that the description may be readily applied to various aspects of one or more methods with equal force.

The apparatus 100 is preferably operable to produce an electronic ID number, including bits ID0, ID1, ID2, . . . IDn. To this end, the apparatus 100 preferably includes a plurality of groups of physical bit elements 102A, 102B . . . 102n, and a plurality of bit logic circuits 104A, 104B . . . 104n, each being associated with a respective one of the groups of physical bit elements 102. Each physical bit element of each group 102 preferably has a first physical state in which it is operable to produce (alone or in combination with other circuit elements) a signal having a first electrical state, for example, representing one of a logic low (0) value and a logic high (1) value. Each of the physical bit elements is preferably further capable of permanent modification to a second physical state in which it is operable to produce a signal having a second electrical state, for example, the other of the logic low value and the logic high value.

Figure 2:
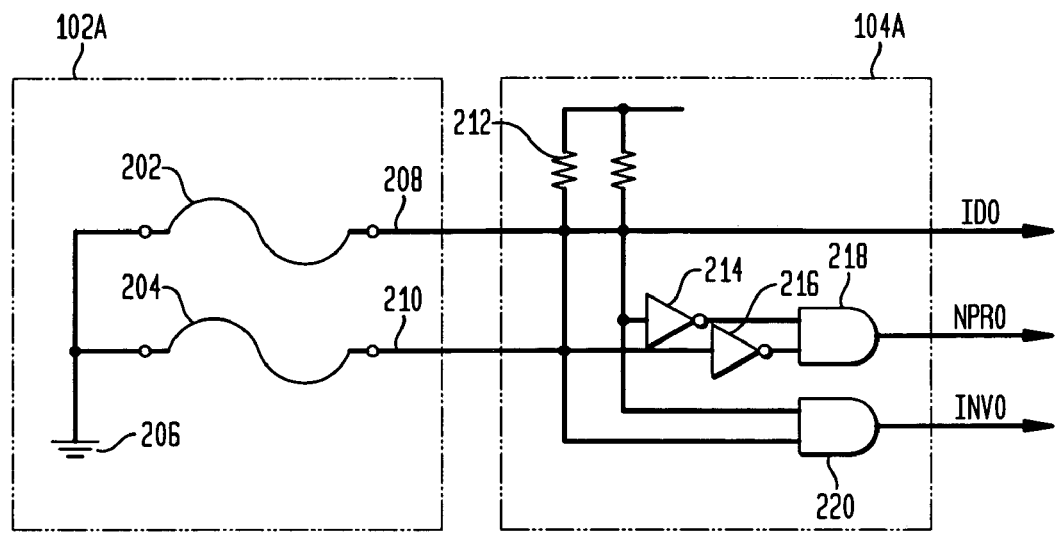
FIG. 2 is a more detailed block diagram illustrating further details of certain elements of the methods and apparatus of FIG. 1.

With reference to FIG. 2, each of the physical bit elements (two such elements being shown by way of example) within the respective groups of physical bit elements 102 are preferably implemented by way of a fusible link. Each of the fusible links 202, 204 preferably has a first physical state in which it is unfused and is substantially electrically conductive between first and second terminals thereof. Each fusible link 202, 204 also preferably includes a second physical state in which it is fused and is substantially electrically non-conductive between its respective terminals. The fusible links 202, 204 may be implemented utilizing any of the known technologies, such as anti-fuse technologies, or any technologies hereinafter developed. More particularly, each physical bit element 202, 204 is preferably coupled in series between a first voltage potential, such as ground 206, and a second, higher voltage potential through respective impedances, such as resistors 212. It is noted that the impedances may be implemented utilizing any of the known technologies and that such impedances may be disposed within the respective groups 102, the respective bit logic circuits 104, or any other suitable location without departing from the sprit and scope of the invention.

The respective signals 208, 210 are preferably taken at a node at which the respective fusible links 202, 204 connect with the respective impedances 212. Thus, the respective signals 208, 210 enjoy a first electrical state at substantially 0 volts (i.e., when the respective fusible link 202, 204 is in the unfused, shorted, first physical state) and a second electrical state at a substantially higher potential (i.e., when the respective fusible links 202, 204 are in the fused, opened, second physical state).

With reference to FIG. 1, each of the bit logic circuits 104A, 104B, 104C, . . . 104n, are preferably operable to produce one bit of the ID number based on the respective signals issuing from each of the groups of physical bit elements 102 (i.e., based on the signals produced, at least in part, by the physical bit elements within each group). To this end, it is preferred that only one valid combination of the electrical states of the respective signals issuing from each group of physical bit elements 102 represents a valid logic high (1) level for the corresponding bit of the ID number. Further, it is preferred that only one different valid combination of the electrical states of the respective signals issuing from each of the groups of physical bit elements 102 represents a valid logic low (0) level for the corresponding bit of the ID number. The respective combinations that represent the valid logic high (1) level and the valid logic low (0) level preferably require that one of the two physical bit elements 202, 204 is in the second physical state and the other of the two physical bit elements 202, 204 is in the first physical state.

By way of example, each group of physical bit elements may preferably include two physical bit elements, such as fusible links 202, 204 illustrated in FIG. 2. It is understood, however, that any number of physical bit elements, greater than one, may be employed without departing from the sprit and scope of the invention. The valid combination representing a valid logic high (1) level preferably requires that one of the two physical bit elements 202, 204 is in the first physical state and the other of the two physical bit elements 202, 204 is in the second physical state. By way of example, if physical bit element 202 is in the second physical state (fused) and the physical bit element 204 is in the first physical state (unfused), then the resulting combination of the electrical states of the respective signals 208, 210 (i.e., 1,0) represents a valid logic high (1) value for the corresponding bit of the ID number. In keeping with this example, if the physical bit element 202 is in the first physical state (unfused) and the physical bit element 204 is in the second physical stated (fused), then the resulting combination of the electrical states of the respective signals 208, 210 issuing therefrom (i.e., 0,1) preferably represents a valid logic low (0) level.

It can be seen from the above that, in accordance with one or more aspects of the present invention, any modification to the physical bit elements, e.g., elements 202, 204, of a given one of the groups of physical bit elements 102, in an attempt to change from a valid combination of the electrical states of the signals (e.g., 208, 210) to another combination results in an invalid combination. Indeed, in the example above, once one of the physical bit elements 202, 204 has been fused (i.e., placed in the second physical state), it cannot thereafter be unfused (i.e., placed in the first physical state) in an attempt to modify the associated bit of the ID number. Although two physical bit elements were utilized in the above example, any number of physical bit elements may be employed without departing from the scope of the invention; however, it will be appreciated from the description herein that the respective valid combinations of the electrical states of the signals preferably require that at least one of the physical bit elements of a given group 102 has been permanently modified to the second physical state (i.e., fused). Moreover, it is preferred that any modification to the physical bit elements of a given group 102, in order to change from a valid combination of the electrical states of the corresponding signals to another combination, requires that at least one of the physical bit elements of the group 102 has to be permanently modified from the first physical state (e.g., unfused) to the second physical state (e.g., fused).

In accordance with one or more further aspects of the present invention, each of the bit logic circuits 104 is preferably further operable to produce a validity signal indicative of whether the corresponding bit of the ID number is valid, and based on the signals issuing from the corresponding group of physical bit elements 102. Those skilled in the art will appreciate that the particular circuit implementation in order to achieve this feature of the invention may take on many different forms depending on available space, manufacturing costs, the number of physical bit elements employed, etc. By way of example and with reference to FIG. 2, when the two physical bit elements 202, 204 are employed in the configuration shown, a relatively elegant circuit implementation may be employed to produce the validity signal INV0 for the corresponding bit ID0 of the ID number. In particular, an AND gate 220 may be employed to receive the respective signals 208, 210 issuing from the group of physical bit elements 102A in order to produce the validity signal INV0. Thus, the state of the validity signal INV0 will be a logic low (0) whenever at least one of the physical bit elements 202, 204 remains in the first physical state (e.g., unfused), indicating the potential for a valid combination. The state of the validity signal INV0, however, transitions to a logic high (1) state when both of the physical bit elements 202, 204 are in the second physical state (e.g., fused).

It is noted that in the example above, the validity signal INV0 would be at a logic low (0) level indicating a potentially valid combination when both of the physical bit elements 202, 204 are in the first physical state (unfused), which is preferably not a valid combination. This discrepancy can be resolved in any number of ways, for example, utilizing an XOR gate in place of the AND gate 220 to produce the validity signal INV0, and defining a logic high (1) level to indicate a valid combination. It is preferred, however, that an additional signal is produced by each of the bit logic circuits 104 which, among other things, addresses this discrepancy.

Each of the bit logic circuits 104 is preferably further operable to produce a program signal, NPR0, NPR1, NPR2 . . . NPRn, indicative of whether any of the physical bit elements of the corresponding group 102 have been modified. For example, the program signal NPRi preferably indicates that the physical bit elements of the corresponding group 102 have not been modified when all of the physical bit elements of that group 102 are in the first physical state (e.g., unfused). Thus, when a valid combination of the physical states of the physical bit elements of the corresponding group 102 requires that one or more of the physical bit elements are in the second physical state, the program signal NPRi preferably indicates that no modification has taken place (i.e., no programming has been achieved) when the one or more physical bit elements that should be in the second physical state are in the first physical state. In keeping with the example hereinabove, and with reference to FIG. 2, a valid combination of the physical states of the physical bit elements 202, 204 requires that one of the elements is in the second physical state (e.g., fused). Thus, when both of the physical bit elements 202, 204 are in the first physical state (e.g., unfused), the program signal NPR0 preferably indicates that no modification and, therefore, no valid combination exists. This, among other things, resolves the discrepancy with the validity signal INV0 under these circumstances.

By way of example, the program signal NPR0 may be produced utilizing two inverters 214, 216, and an AND gate 218. Thus, the program signal NPR0 would have a logic high (1) when neither of the physical bit elements 202, 204 have been modified from the first physical state (unfused) to the second physical state (e.g., fused). Further, the program signal NPR0 would have a logic low (0) level when either one of the physical bit elements 202, 204 have been programmed.

Figure 3:
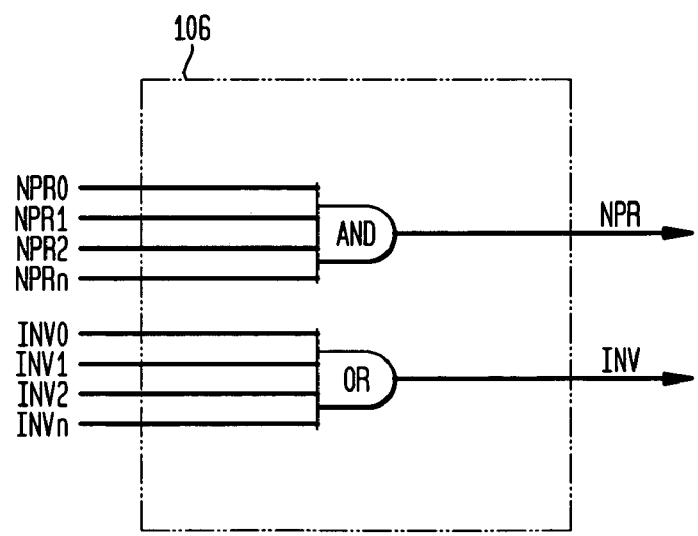
FIG. 3 is a block diagram illustrating still further details concerning other elements of the methods and apparatus of FIG. 1.

With reference to FIGS. 1 and 3, and in accordance with one or more further aspects of the present invention, the apparatus 100 preferably further includes an ID logic circuit 106 that is operable to receive one or more of the validity signals INV0, INV1, INV2 . . . INVn from the bit logic circuits 104 and produce an overall validity signal INV indicative of whether any of the bits of the ID number are invalid. Preferably, the overall validity signal INV is further indicative of whether none of the bits of the ID number are invalid (i.e., whether the ID number as whole is valid). With reference to FIG. 3, and in keeping with the example hereinabove, the overall validity signal INV may be produced by employing one or more OR gates receiving the respective validity signals INV0, INV1, INV2 . . . INVn. Thus, the overall validity signal INV will have a logic high (1) level when at least one of the bits of the ID number ID0, ID1, ID2, . . . IDn is invalid, and will have a logic low (0) level when all of the bits of the ID number are valid.

In accordance with one or more further aspects of the present invention, the ID logic circuit 106 is preferably further operable to receive one or more of the program signals NPRi from the bit logic circuits 104 and produce an overall program signal NPR indicative of at least whether at least one of the physical bit elements of each of the groups 102 have been modified. The overall program signal NPR is preferably also indicative of whether any of the physical bit elements of any of the groups 102 have been modified. With reference to FIG. 3, the overall program signal NPR may be produced utilizing one or more AND gates to take the logic AND of all of the respective program signals NPR0, NPR1, NPR2 . . . NPRn. Assuming that a given program signal NPRi indicates no modification of the corresponding physical bit elements when it is at a logic high (1) level, then the overall program signal NPR will have a logic high (1) level when none of the respective physical bit elements of the groups 102 have been modified. Further, the overall program signal NPR will have a logic low (0) level when at least one of the respective physical bit elements of the groups have been modified. Advantageously, the overall program signal NPR may be utilized to automatically determine whether an ID number has been programmed or not.

In accordance with one or more further aspects of the present invention, the methods and apparatus for producing the ID number described hereinabove may be achieved utilizing suitable hardware, such as that shown in the drawings. It is noted that such hardware may be implemented utilizing any of the known technologies, such as standard digital circuits, analog circuitry, any of the known processors that are operable to execute software and/or firmware programs, one or more programmable digital devices or systems, such as programmable read only memories (PROMs), programmable array logic devices (PALs), any combination of the above, etc.

Advantageously, the methods and apparatus of the present invention enable determinations of whether an electronic ID number is valid and whether the ID number has been modified in an unauthorized manner.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus, comprising:
at least first and second groups of physical bit elements, each physical bit element of each group having a first physical state in which it is operable to produce a signal having a first electrical state, and being capable of permanent modification to a second physical state in which it is operable to produce a signal having a second electrical state; wherein each group comprises at least two physical bit elements; and
at least first and second bit logic circuits, each being associated with a respective one of the at least first and second groups of physical bit elements, and each operable to produce (i) one bit of an identification (ID) number from the respective signals issuing from each of the respective at least first and second groups of physical bit elements, and (ii) a validity signal indicative of whether the one bit of the ID number is valid;
wherein only one valid combination of the electrical states of the respective signals issuing from each of the respective at least first and second groups of physical bit elements represents a valid logic high level for the corresponding bit of the ID number, and only one different valid combination of the electrical states of the respective signals issuing from each of the respective at least first and second groups of physical bit elements represents a valid logic low level for the corresponding bit of the ID number;

wherein valid combinations of the electrical states of the signals each require that at least one of the physical bit elements of a given one of the groups of physical bit elements has been permanently modified to the second physical state in which it produces a signal having the second electrical state;

wherein any modification to the physical bit elements of a given one of the groups of physical bit elements in order change from a valid combination of the electrical states of the signals to another combination requires that at least one of the physical bit elements of a given one of the groups of physical bit elements has to be permanently modified from the first physical state to the second physical state.

2. The apparatus of claim 1, wherein each of the bit logic circuits is further operable to produce a program signal indicative of whether any of the physical bit elements of a respective one of the groups have been modified.

3. The apparatus of claim 2, wherein the program signal indicates that the physical bit elements of a respective one of the groups have not been modified when all of the physical bit elements of that group are in the first physical state.

4. The apparatus of claim 2, wherein the program signal indicates that the physical bit elements of a respective one of the groups have not been modified when (i) a valid combination of the physical states of the physical bit elements of that group requires that one or more of the physical bit elements of that group are in the second physical state, and (ii) the one or more of the physical bit elements are in the first physical state.

5. The apparatus of claim 1, further comprising an ID logic circuit operable to receive one or more of the program signals from the bit logic circuits and produce an overall program signal indicative of at least one of whether (i) any of the physical bit elements of any of the groups have been modified, and (ii) at least one of the physical bit elements of each of the groups have been modified.

6. The apparatus of claim 1, further comprising an ID logic circuit operable to receive one or more of the validity signals from the bit logic circuits and produce an overall validity signal indicative of at least one of whether (i) any of the bits of the ID number are invalid, and (ii) none of the bits of the ID number are invalid.

7. The apparatus of claim 1, wherein:
each group consists of two physical bit elements;
the valid combination representing a valid logic high level requires that one of the two physical bit elements is in the first physical state and the other of the two physical bit elements is in the second physical state; and
the different valid combination representing a valid logic low level requires that the one of the two physical bit elements is in the second physical state and the other of the two physical bit elements is in the first physical state.

8. The apparatus of claim 1, wherein each of the physical bit elements is a fusible link having an unfused, conductive, first physical state, and having a fused, electrically non-conductive, second physical state.

9. The apparatus of claim 8, wherein each physical bit element is coupled in a series combination with an impedance between two voltage potentials, and the corresponding signal is taken at a node between the physical bit element and the impedance.

10. The apparatus of claim 9, wherein:
each physical bit element and each impedance includes respective first and second terminals;
the first terminal of each physical bit element being coupled to a first voltage potential and the second terminal of each physical bit element being coupled to the first terminal of a respective one of the impedances; and
the second terminal of each impedance being coupled to a second, higher, voltage potential.

11. A method, comprising:
modifying at least one physical bit element from among each of at least first and second groups of physical bit elements, each physical bit element of each group having a first physical state in which it is operable to produce a signal having a first electrical state, and being capable of permanent modification to a second physical state in which it is operable to produce a signal having a second electrical state; wherein each group comprises at least two physical bit elements and producing (i) one bit of an identification (ID) number from the respective signals issuing from each of the respective at least first and second groups of physical bit elements, and (ii) a validity signal indicative of whether the one bit of the ID number is valid;

wherein only one valid combination of the electrical states of the respective signals issuing from each of the respective at least first and second groups of physical bit elements represents a valid logic high level for the corresponding bit of the ID number, and only one different valid combination of the electrical states of the respective signals issuing from each of the respective at least first and second groups of physical bit elements represents a valid logic low level for the corresponding bit of the ID number;

wherein valid combinations of the electrical states of the signals each require that at least one of the physical bit elements of a given one of the groups of physical bit elements has been permanently modified to the second physical state in which it produces a signal having the second electrical state;

wherein any modification to the physical bit elements of a given one of the groups of physical bit elements in order change from a valid combination of the electrical states of the signals to another combination requires that at least one of the physical bit elements of a given one of the groups of physical bit elements has to be permanently modified from the first physical state to the second physical state.

12. The method of claim 11, further comprising producing a program signal indicative of whether any of the physical bit elements of a respective one of the groups have been modified.

13. The method of claim 12, wherein the program signal indicates that the physical bit elements of a respective one of the groups have not been modified when all of the physical bit elements of that group are in the first physical state.

14. The method of claim 12, wherein the program signal indicates that the physical bit elements of a respective one of the groups have not been modified when (i) a valid combination of the physical states of the physical bit elements of that group requires that one or more of the physical bit elements of that group are in the second physical state, and (ii) the one or more of the physical bit elements are in the first physical state.

15. The method of claim 11, further comprising receiving one or more of the program signals, and producing an overall program signal indicative of at least one of whether (i) any of the physical bit elements of any of the groups have been modified, and (ii) at least one of the physical bit elements of each of the groups have been modified.

16. The method of claim 11, further comprising receiving one or more of the validity signals, and producing an overall validity signal indicative of at least one of whether (i) any of the bits of the ID number are invalid, and (ii) none of the bits of the ID number are invalid.

17. The method of claim 11, wherein:
each group consists of two physical bit elements;
the valid combination representing a valid logic high level requires that one of the two physical bit elements is in the first physical state and the other of the two physical bit elements is in the second physical state; and
the different valid combination representing a valid low level requires that the one of the two physical bit elements is in the second physical state and the other of the two physical bit elements is in the first physical state.

18. The method of claim 11, wherein each of the physical bit elements is a fusible link having an unfused, electrically conductive, first physical state, and having a fused, electrically non-conductive, second physical state.

19. The method of claim 18, wherein each physical bit element is coupled in a series combination with an impedance between two voltage potentials, and the corresponding signal is taken at a node between the physical bit element and the impedance.

20. The method of claim 19, wherein:
each physical bit element and each impedance includes respective first and second terminals;
the first terminal of each physical bit element being coupled to a first voltage potential and the second terminal of each physical bit element being coupled to the first terminal of a respective one of the impedances; and
the second terminal of each impedance being coupled to a second, higher, voltage potential.

21. An apparatus, comprising:
at least first and second groups of physical bit elements, each physical bit element of each group having a first physical state in which it is operable to produce a signal having a first electrical state, and being capable of permanent modification to a second physical state in which it is operable to produce a signal having a second electrical state, wherein each group of physical bit elements is operable to produce at least one bit of an identification (ID) number; wherein each group comprises at least two physical bit elements; and
at least first and second bit logic circuits, each being associated with a respective one of the at least first and second groups of physical bit elements, and each operable to produce a validity signal from one or more of a respective group of physical bit elements the validity signal being indicative of whether the one bit of the ID number is valid;
wherein only one valid combination of the electrical states of the respective signals issuing from each of the respective at least first and second groups of physical bit elements represents a valid logic high level for the corresponding bit of the ID number, and only one different valid combination of the electrical states of the respective signals issuing from each of the respective at least first and second groups of physical bit elements represents a valid logic low level for the corresponding bit of the ID number;
wherein valid combinations of the electrical states of the signals each require that at least one of the physical bit elements of a given one of the groups of physical bit elements has been permanently modified to the second physical state in which it produces a signal having the second electrical state;
wherein any modification to the physical bit elements of a given one of the groups of physical bit elements in order change from a valid combination of the electrical states of the signals to another combination requires that at least one of the physical bit elements of a given one of the groups of physical bit elements has to be permanently modified from the first physical state to the second physical state.

22. The apparatus of claim 21, wherein each of the bit logic circuits is further operable to produce a program signal indicative of whether any of the physical bit elements of a respective one of the groups have been modified.

23. The apparatus of claim 22, wherein the program signal indicates that the physical bit elements of a respective one of the groups have not been modified when all of the physical bit elements of that group are in the first physical state.

24. The apparatus of claim 22, wherein the program signal indicates that the physical bit elements of a respective one of the groups have not been modified when (i) a valid combination of the physical states of the physical bit elements of that group requires that one or more of the physical bit elements of that group are in the second physical state, and (ii) the one or more of the physical bit elements are in the first physical state.

25. The apparatus of claim 21, wherein:
each group consists of two physical bit elements;
the valid combination representing a valid logic high level requires that one of the two physical bit elements is in the first physical state and the other of the two physical bit elements is in the second physical state; and
the different valid combination representing a valid logic low level requires that the one of the two physical bit elements is in the second physical state and the other of the two physical bit elements is in the first physical state.

26. The apparatus of claim 21, wherein each of the physical bit elements is a fusible link having an unfused, substantially electrically conductive, first physical state, and having a fused, electrically non-conductive, second physical state.

* * * * *

UNITED STATES PATENT AND TRADEMARK OFFICE
CERTIFICATE OF CORRECTION

| | | |
|---|---|---|
| PATENT NO. | : 7,269,745 B2 | Page 1 of 1 |
| APPLICATION NO. | : 10/245946 | |
| DATED | : September 11, 2007 | |
| INVENTOR(S) | : Hidetaka Magoshi | |

It is certified that error appears in the above-identified patent and that said Letters Patent is hereby corrected as shown below:

Column 9, line 60, "unfused, conductive," should read --unfused, electrically conductive,--

Signed and Sealed this

Twenty-second Day of July, 2008

JON W. DUDAS
*Director of the United States Patent and Trademark Office*